United States Patent
Schoor

(10) Patent No.: US 10,436,891 B2
(45) Date of Patent: Oct. 8, 2019

(54) RADAR SENSOR, CORRESPONDING OPERATING METHOD AND VEHICLE

(71) Applicant: Robert Bosch GmbH, Stuttgart (DE)

(72) Inventor: Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 15/377,520

(22) Filed: Dec. 13, 2016

(65) Prior Publication Data
US 2017/0176584 A1    Jun. 22, 2017

(30) Foreign Application Priority Data
Dec. 22, 2015   (DE) .................. 10 2015 226 443

(51) Int. Cl.
| | |
|---|---|
| G01S 13/42 | (2006.01) |
| G01S 13/58 | (2006.01) |
| G01S 13/93 | (2006.01) |
| G01S 13/22 | (2006.01) |
| G01S 13/34 | (2006.01) |

(52) U.S. Cl.
CPC .............. *G01S 13/42* (2013.01); *G01S 13/22* (2013.01); *G01S 13/343* (2013.01); *G01S 13/347* (2013.01); *G01S 13/58* (2013.01); *G01S 13/931* (2013.01)

(58) Field of Classification Search
CPC .......... G01S 13/12; G01S 13/22; G01S 13/34; G01S 13/343; G01S 13/347; G01S 13/58; G01S 13/931
See application file for complete search history.

(56) References Cited

U.S. PATENT DOCUMENTS

| | | | | | |
|---|---|---|---|---|---|
| 3,878,525 | A | * | 4/1975 | Alpers ................ | G01S 13/343 342/109 |
| 5,309,160 | A | * | 5/1994 | Powell ................ | G01S 13/70 342/128 |
| 5,325,097 | A | * | 6/1994 | Zhang ................ | G01S 13/34 342/130 |
| 5,345,470 | A | * | 9/1994 | Alexander ............ | G01S 7/023 375/144 |

(Continued)

FOREIGN PATENT DOCUMENTS

DE    102013212090 A1    1/2015

*Primary Examiner* — Peter M Bythrow
(74) *Attorney, Agent, or Firm* — Norton Rose Fulbright US LLP; Gerard Messina

(57) ABSTRACT

A radar sensor for detecting at least one object, having a control device to receive a control input signal; a signal generator to generate a transmit signal having a multitude of signal cycles, each signal cycle having a multitude of signal sequences, and a series of blocks being formed, each block having precisely one frequency ramp of each signal sequence, and the signal generator furthermore being designed to select a predefined quantity of blocks from the transmit signal based on the control input signal and to output them as output signal; an antenna device to transmit the output signal that is output by the signal generator and to receive a receive signal; and an evaluation device which is designed to ascertain, by superpositioning the transmit signal and the receive signal, a quantity with regard to an angle and/or a distance and/or a relative speed of the at least one object.

11 Claims, 5 Drawing Sheets

(56) References Cited

U.S. PATENT DOCUMENTS

| | | | | |
|---|---|---|---|---|
| 5,963,163 A * | 10/1999 | Kemkemian | G01S 13/34 | 342/109 |
| 6,633,815 B1 * | 10/2003 | Winter | G01S 13/956 | 701/301 |
| 6,646,587 B2 * | 11/2003 | Funai | G01S 13/26 | 342/26 R |
| 7,508,337 B2 * | 3/2009 | Morinaga | G01S 7/352 | 342/109 |
| 7,724,181 B2 * | 5/2010 | Natsume | G01S 13/426 | 342/103 |
| 7,786,927 B2 * | 8/2010 | Kondoh | G01S 7/35 | 342/109 |
| 7,791,530 B2 * | 9/2010 | Puglia | G01S 7/352 | 342/128 |
| 8,077,076 B2 * | 12/2011 | Walter | G01S 13/345 | 342/118 |
| 8,390,506 B2 * | 3/2013 | Focke | G01S 13/345 | 342/112 |
| 8,872,674 B1 * | 10/2014 | Subramanya | G01S 7/2926 | 340/933 |
| 9,354,304 B2 * | 5/2016 | Kirsch | G01S 13/58 | |
| 9,853,365 B2 * | 12/2017 | Kumar | H01Q 23/00 | |
| 2003/0052813 A1 * | 3/2003 | Natsume | G01S 7/354 | 342/70 |
| 2004/0130482 A1 * | 7/2004 | Lin | G01S 7/023 | 342/82 |
| 2005/0225481 A1 * | 10/2005 | Bonthron | G01S 7/032 | 342/175 |
| 2007/0152871 A1 * | 7/2007 | Puglia | G01S 7/352 | 342/70 |
| 2008/0100500 A1 * | 5/2008 | Kondoh | G01S 7/35 | 342/109 |
| 2008/0122680 A1 * | 5/2008 | Morinaga | G01S 7/352 | 342/109 |
| 2009/0140912 A1 * | 6/2009 | Kato | G01S 7/35 | 342/70 |
| 2009/0309782 A1 * | 12/2009 | Takabayashi | G01S 13/343 | 342/105 |
| 2010/0277361 A1 * | 11/2010 | Focke | G01S 13/345 | 342/133 |
| 2010/0289692 A1 * | 11/2010 | Winkler | G01S 7/4008 | 342/70 |
| 2011/0122014 A1 * | 5/2011 | Szajnowski | G01S 7/023 | 342/109 |
| 2013/0069818 A1 * | 3/2013 | Shirakawa | G01S 13/347 | 342/146 |
| 2014/0022111 A1 * | 1/2014 | Kuehnle | G01S 13/584 | 342/109 |
| 2014/0253365 A1 * | 9/2014 | Kirsch | G01S 13/58 | 342/112 |
| 2014/0347211 A1 * | 11/2014 | Schoor | G01S 7/35 | 342/147 |
| 2015/0002332 A1 * | 1/2015 | Bi | G01S 7/35 | 342/200 |
| 2015/0301172 A1 * | 10/2015 | Ossowska | G01S 7/023 | 342/70 |
| 2016/0131742 A1 * | 5/2016 | Schoor | H01Q 1/3233 | 342/128 |
| 2016/0187462 A1 * | 6/2016 | Altus | G01S 7/35 | 342/175 |
| 2018/0045819 A1 * | 2/2018 | Cornic | G01S 13/28 | |

* cited by examiner

RADAR SENSOR, CORRESPONDING OPERATING METHOD AND VEHICLE

CROSS REFERENCE

The present application claims the benefit under 35 U.S.C. § 119 of German Patent Application No. DE 102015226443.2 filed on Dec. 22, 2015, which is expressly incorporated herein by reference in its entirety.

FIELD

The present invention relates to a radar sensor for detecting at least one object, to a vehicle having a radar sensor, and to an operating method of a radar sensor for detecting at least one object.

BACKGROUND INFORMATION

Radar sensors are utilized to an increasing extent in the automotive field. For example, an angle-resolving FMCW radar sensor is described in German Patent Application No. DE 10 2013 212 090 A1. However, the demands on the radar sensors are increasing steadily. High availability, even at very high operating temperatures, is required, in particular. However, on account of small and cost-effective housings, heat emitted by the electronic system in the radar sensor is often no longer able to be dissipated quickly enough.

SUMMARY

The present invention provides a radar sensor for detecting at least one object, and an operating method of a radar sensor for detecting at least one object.

According to a first aspect, the present invention provides a radar sensor for detecting at least one object, the radar sensor including a control device which is designed to receive a control input signal, a signal generator which is designed to generate a transmit signal having a multitude of signal cycles, each signal cycle having a multitude of signal sequences, and each signal sequence having an identical multitude of frequency ramps, the frequency ramps of the signal sequences being interlaced with one another in a predefined sequence without overlap, and a series of blocks being formed, each block having exactly one frequency ramp of each signal frequency, and the signal generator furthermore being designed to select a predefined number of blocks from the transmit signal based on the control input signal and to output them as output signal. In addition, the radar sensor includes an antenna device which is designed to transmit the output signal that is output by the signal generator and to receive a receive signal; and it includes an evaluation device which is designed to ascertain a quantity with regard to an angle and/or a distance and/or a relative speed of the at least one object by superpositioning the transmit signal and the receive signal.

In addition, the present invention provides a vehicle having a radar sensor and an ascertainment device that is designed to ascertain a quantity with regard to a driving parameter and/or an operating state of the vehicle, and to transmit it as control input signal to the control device of the radar sensor.

Finally, the present invention provides an operating method of a radar sensor for detecting at least one object, the method having the following steps: receiving a control input signal, generating a transmit signal having a multitude of signal cycles, each signal cycle having a multitude of signal sequences, each signal sequence having a respective identical multitude of frequency ramps, the frequency ramps of the signal sequences being interlaced with one another in a predefined sequence without overlap, and a series of blocks being formed, each block having precisely one frequency ramp of each signal frequency; selecting a predefined quantity of blocks from the transmit signal based on the control input signal, and outputting the predefined quantity of blocks as output signal, transmitting the output signal, receiving a receive signal, and ascertaining a quantity with regard to an angle and/or a distance and/or a relative speed of the at least one object by superpositioning the transmit signal and the receive signal.

Preferred further developments are described herein.

The radar sensor according to the present invention has the advantage that a number of the blocks transmitted as output signal are able to be controlled via a control input signal. For example, given high capacity utilization of the radar sensor, the number of transmitted blocks can be reduced. The transmit time of the antenna device is thereby reduced, so that a current consumption of the radar sensor drops and a heat development of the radar sensor lessens as a result. This makes it possible to save energy on the one hand, and an operating temperature of the radar sensor can be reduced on the other. Overheating of the radar sensor is therefore prevented in an effective manner. At the same time, an effective ascertainment of an angle, a distance or a relative speed of the at least one object continues to be available even when the output blocks are reduced, or in other words, when certain blocks are omitted. In this context it is especially advantageous that no adaptation of the parameters is required in comparison to the evaluation of transmit signals in which all blocks are output as output signal.

The omission of blocks, in particular, is easy to simulate without the need to carry out new test drives. Instead, already existing data sets are able to be utilized, and the data can be appropriately adapted by numerical simulation.

According to one advantageous further refinement of the radar sensor, at a predefined control input signal, the signal generator is designed to select in at least one signal cycle all blocks except for a first number of blocks at the beginning of the signal cycle and/or a second number of blocks at the end of the signal cycle, and to output them as output signal. In the remaining signal cycles, all blocks may be output, in particular. In an advantageous manner, this does not reduce the time resolution of the signal detection. Instead, only individual signal cycles are reduced by omitting blocks. The time resolution, on the other hand, is maintained.

According to one preferred further development of the radar sensor, the first number of blocks is as large as the second number of blocks. This has the advantage that a center frequency of the signal sequences in the output signal is not altered, meaning that it corresponds to a center frequency of a transmit signal in which all blocks are transmitted.

According to one preferred further development of the radar sensor, the signal generator is designed to select none of the blocks for the output signal in at least one signal cycle at a predefined control input signal. Thus, at least one entire signal cycle is omitted in the output signal transmitted by the antenna device. In this context, it is preferably also possible to periodically omit entire signal cycles, and a period of the omitted signal cycles may depend on the control input signal.

This specific embodiment has the advantage that the resolution, i.e., in particular, the signal-to-noise ratio, of the transmitted signal cycles remains unchanged so that in particular a range of the radar sensors is not altered. This is advantageous especially when a range is to be considered more important than a time resolution, for instance when driving a vehicle on an expressway.

According to one preferred further refinement of the radar sensor, the evaluation device is designed to ascertain the relative speed of the at least one object by superpositioning the transmit signal and the receive signal; to calculate frequency spectrums for each signal sequence for each signal cycle; to ascertain possible quantities with regard to the angle and/or the distance and/or the relative speed of the at least one object on the basis of position, amplitude and phase of the signals in the frequency spectrums; and to resolve possible ambiguities and to ascertain an unambiguous quantity with regard to the angle and/or the distance and/or the relative speed of the at least one object by comparing the possible quantities using position, amplitude and phase of the signals.

According to one preferred further refinement of the vehicle, the ascertainment device is designed to measure an operating temperature of the radar sensor and to transmit it as control input signal to the control device of the radar sensor; the signal generator of the radar sensor is furthermore designed to ascertain the number of the blocks selected for the output signal on the basis of the operating temperature of the radar sensor. In particular at a high operating temperature of the radar sensor, fewer blocks may be selected than would be at a low operating temperature in order to save energy and to thereby reduce the heating of the radar sensor. In particular, the ascertainment device may be designed to regulate the operating temperature of the radar sensor to a specified value by reducing the number of selected blocks until the operating temperature of the radar sensor reaches the specified value.

According to one preferred further refinement of the operating method, at a predefined control input signal, all blocks except for a first number of blocks at the beginning of the signal cycle and a second number of blocks at the end of the signal cycle, are selected in at least one signal cycle and output as output signal.

According to one preferred further refinement of the operating method, none of the blocks is selected for the output signal in at least one signal cycle at a predefined control input signal.

According to one preferred further refinement of the operating method, the ascertainment of the quantity with regard to the angle and/or the distance and/or the relative speed of the at least one object includes a first step of superpositioning the transmit signal and the receive signal. Furthermore, frequency spectrums are calculated for each signal sequence for each signal cycle. In addition, possible quantities with regard to the angle and/or the distance and/or the relative speed of the at least one object are ascertained on the basis of position, amplitude and phase of the signals in the frequency spectrums. Finally, possible ambiguities are resolved and an unambiguous quantity with regard to the angle and/or the distance and/or the relative speed of the at least one object is ascertained by comparing the possible quantities using position, amplitude and phase of the signals.

DETAILED DESCRIPTION OF EXAMPLE EMBODIMENTS

Figure 1:
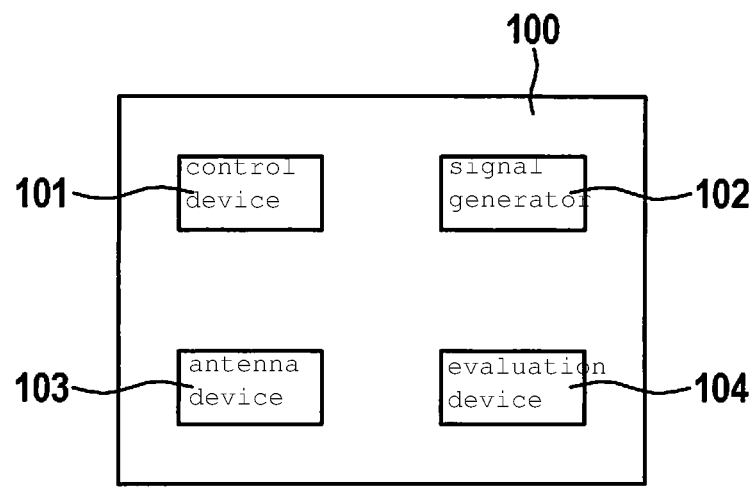
FIG. 1 shows a block diagram of a radar sensor according to the present invention.

Unless otherwise stated, identical or functionally equivalent elements and devices have been provided with the same reference numerals in all of the figures. The numbering of the method steps is provided for better clarity and especially is not meant to imply a certain time sequence, unless noted otherwise. In particular, multiple method steps may also be executed simultaneously. Furthermore, different specific embodiments, unless indicated otherwise, may be combined with one another as desired.

FIG. 1 shows a block diagram of a radar sensor 100 according to one specific embodiment of the present invention. Radar sensor 100 is developed for detecting at least one object. Radar sensor 100 includes a control device 101, which is designed to receive a control input signal. The control input signal may be supplied by an external device, in particular.

Figure 2:
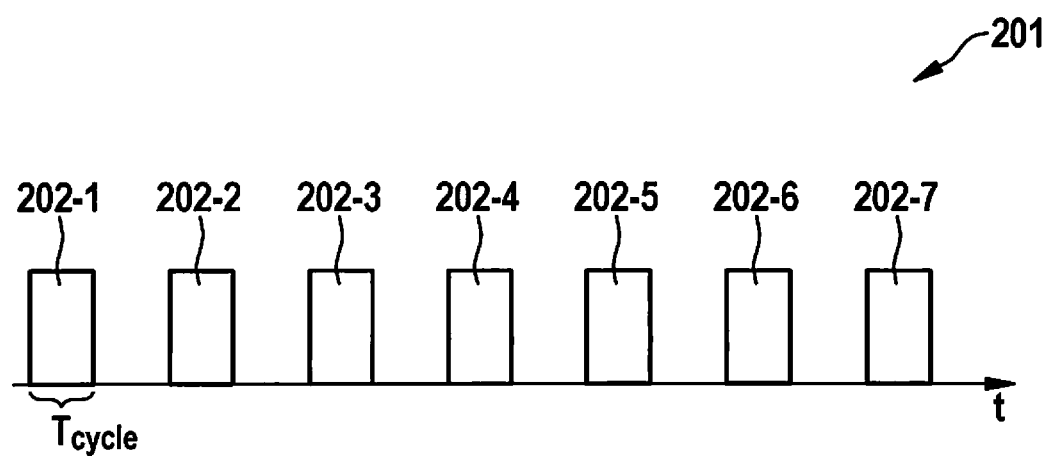
FIG. 2 shows an exemplary transmit signal.

In addition, radar sensor 100 includes a signal generator 102, which is designed to generate a transmit signal 201, as illustrated in FIG. 2. Transmit signal 201 includes a multitude of signal cycles 202-1 through 202-7. Preferably, a cycle period $T_{cycle}$ lies between 10 and 100 µs. The different signal cycles 202-1 through 202-7 may be spaced further apart from one another in terms of time.

Figure 3:
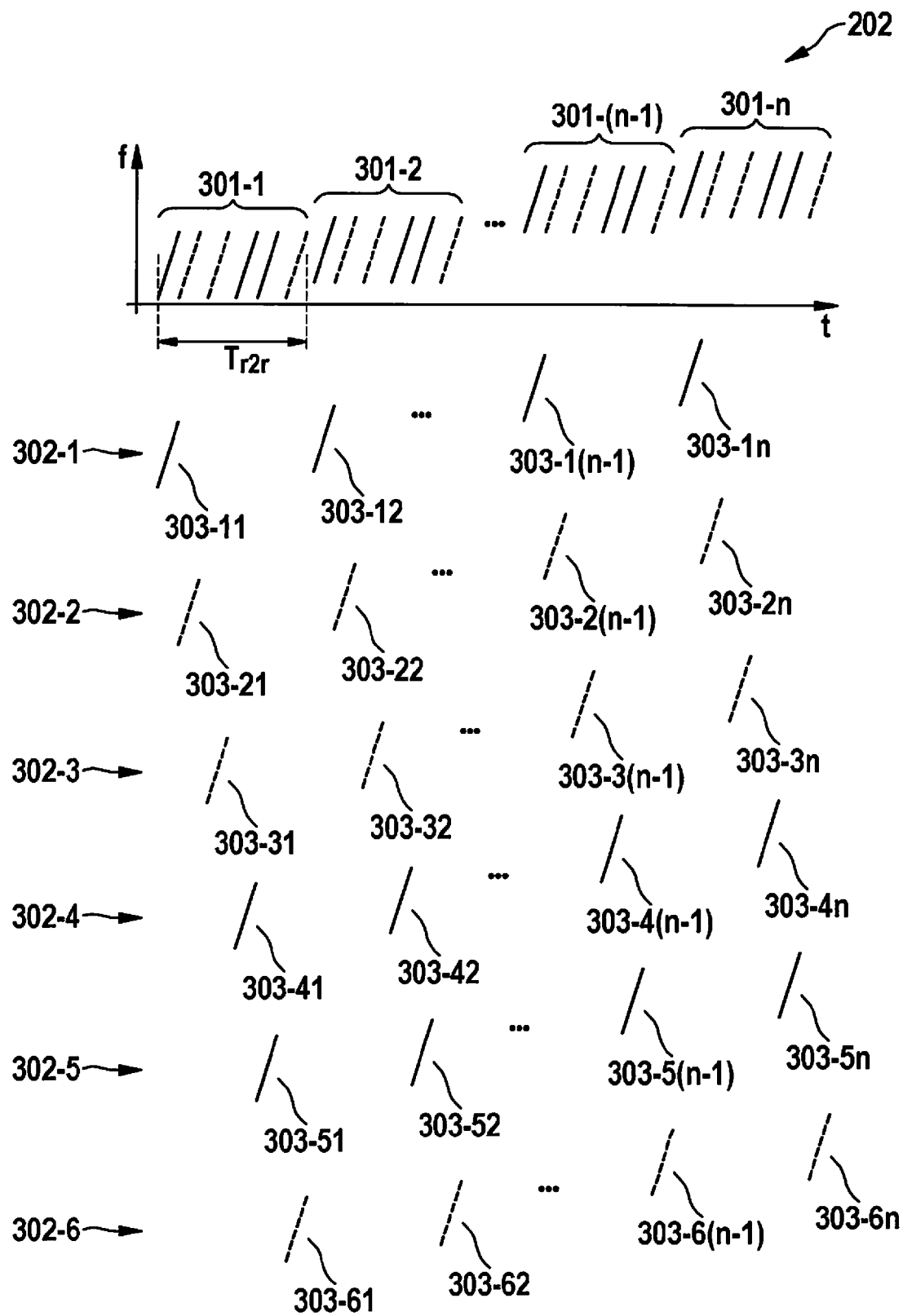
FIG. 3 shows an exemplary signal cycle.

FIG. 3 illustrates an exemplary signal cycle 202. Signal cycle 202 includes six signal sequences 302-1 through 302-6. Each signal sequence 302 includes an identical multitude n of frequency ramps or fast ramps (chirps) 303. First signal sequence 302, for example, includes a multitude n of frequency ramps 303-1*l* through 303-1*n*. A center frequency of the fast ramps in turn describes a linear frequency ramp having a center frequency $f_0$, which is also referred to as a slow ramp. However, the present invention is not restricted to this. For example, the slow ramp may also have a frequency lift of zero, i.e. the frequency ramps are not offset from one another in the frequency, but rather exhibit an identical frequency response characteristic.

Frequency ramps 303 of signal sequences 302 are interlaced with one another in a predefined sequence by the signal generator, or in other words, are interlaced in a fixed sequence. In this way a series of blocks 301-1 through 301-*n* are produced which are made up of one frequency ramp 303 of each signal sequence 302 in each case, and frequency ramps 303 do not overlap in time. The dependency of the frequency of signal cycle 202 on time t is shown in FIG. 3 at the top. According to further developments of the present invention, frequency gaps may be formed between frequency ramps 303 of blocks 301 and/or between blocks 301.

Signal generator 102 is designed to select a predefined quantity of blocks 301 from transmit signal 201 based on the control input signal, and to output them as output signal.

Figure 4:
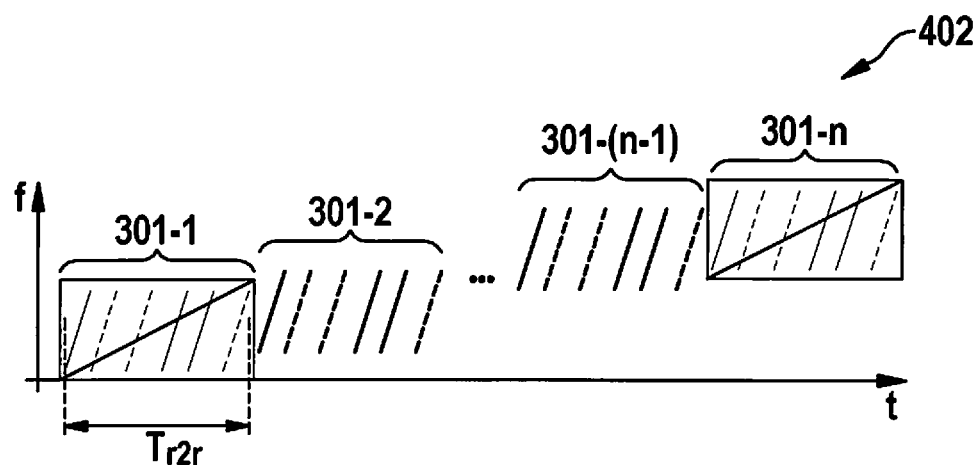
FIG. 4 shows an exemplary signal cycle of an output signal.

For example, as illustrated in FIG. 4, it is possible not to select first block 301-1 and last block 301-*n* from at least one signal cycle 202, whereas the center blocks 301-2 through 301-(n-1) are selected. The result is a shortened signal cycle 402 as part of an output signal.

However, according to further developments, other quantities of blocks may also be selected. For example, all blocks, with the exception of a first number of blocks 301 at the beginning of signal cycle 202 and/or a second number of blocks at the end of signal cycle 202, are able to be selected. Preferably, the first number of blocks 301 here is as large as the second number of blocks 301, since the center frequency of the slow ramp of signal sequences 302 in the selected ramps does not change as a consequence.

Figure 5:
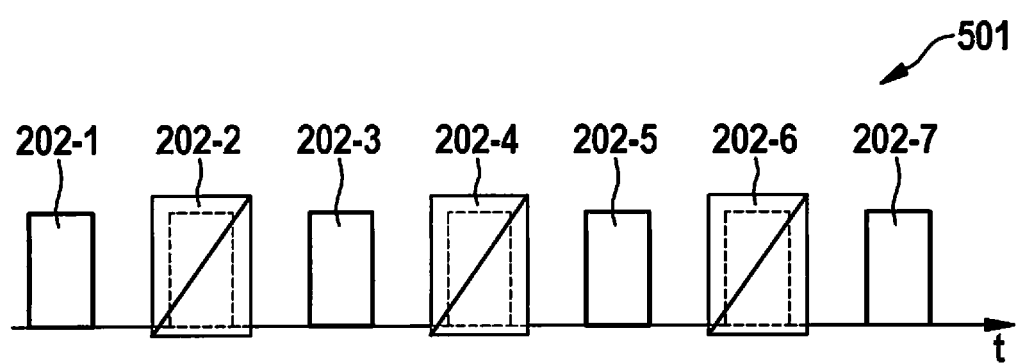
FIGS. 5, 6 show exemplary output signals.

FIG. 5 shows another possible output signal 501 as a function of a control input signal. Here, the signal generator selects each second signal cycle 202 from transmit signal 201, while the other signal cycles are not selected. In other words, all blocks from signal cycles 202-1, 202-3, 202-5 and 202-7 are selected for the output signal, while none of blocks 301 from signal cycles 202-2, 202-4 and 202-6 are selected for the output signal.

Figure 6:
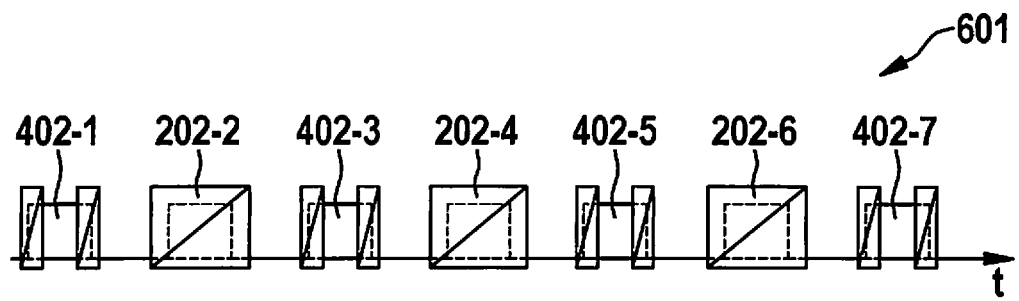

FIG. 6 depicts a combination of the signals shown in FIG. 4 and FIG. 5. Here, signal generator 102 outputs an output signal 601 as a function of the control input signal, and signal cycles 202-2, 202-4 and 202-6 are omitted, i.e. none of respective blocks 301 is selected, while shortened signal cycles 402-1, 402-3, 402-5 and 402-7 are selected for output signal 601 in signal cycles 202-1, 202-3, 202-5 and 202-7, as illustrated in FIG. 4.

In addition, radar sensor 100 includes an antenna device 103 which is designed to transmit the output signal that was output by signal generator 102 and to receive a receive signal. The receive signal corresponds to the reflection of the output signal at the at least one object.

Furthermore, radar sensor 100 includes an evaluation device 104 which is designed to ascertain a quantity with regard to an angle and/or a distance and/or a relative speed of the at least one object by superpositioning the transmit signal and the receive signal. Evaluation device 104, for instance, may be designed to superposition the transmit signal and the receive signal and to calculate a respective frequency spectrum for each signal sequence 302 of each signal cycle 202. Based on the position, amplitude and phase of the signals in the frequency spectrums, evaluation device 104 may be developed to ascertain a possible quantity with regard to the angle and/or the distance and/or the relative speed of the at least one object. As a result, evaluation device 104 ascertains a possible quantity for each of the frequency spectrums, i.e., for each signal frequency of each signal cycle.

Moreover, evaluation device 104 is designed to resolve possible ambiguities and to ascertain an unambiguous quantity with regard to the angle and/or the distance and/or the relative speed of the at least one object by comparing the possible quantities using position, amplitude and phase of the signals for each signal cycle.

Here, the frequency spectrum can be ascertained with the aid of a two-dimensional fast Fourier transformation. Prior to the solving, a non-coherent integration may optionally be performed. Peaks are detected in the two-dimensional frequency spectrum. The solving is accomplished by comparing the phase shift of the peaks in the measured frequency spectrums to the phase relations expected for the possible quantities.

In the case of three sequences, the following control vector may be used:

$$\alpha(v) = 1/\sqrt{3}(4\pi f_0 T_{12} v/c)), \exp(4\pi f_0 T_{13} v/c))^T.$$

Here, $f_0$ is a center frequency of frequency ramps 303, v is the relative speed of the at least one object, c is the speed of light, and $T_{ij}$ for (i,j)=(1,2), and (1,3) is the temporal shift of the frequency ramps of the $i^{th}$ signal sequence and the $j^{th}$ signal sequence.

Figure 7:
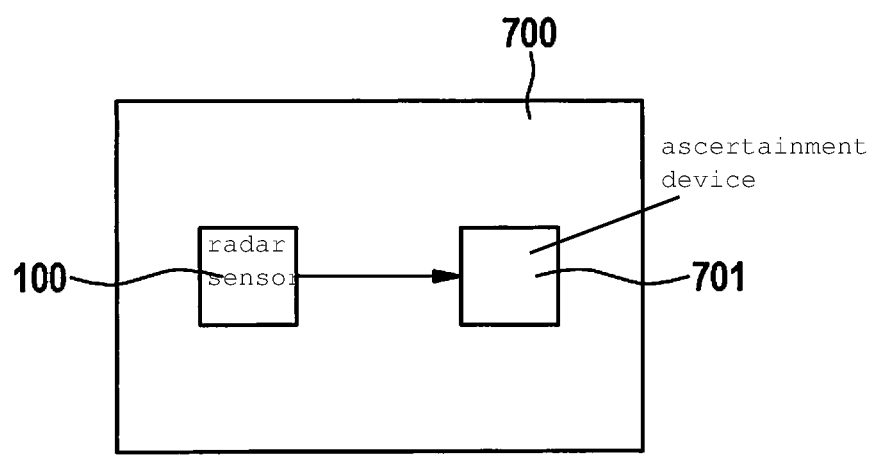
FIG. 7 shows a block diagram of a vehicle according to the present invention.

FIG. 7 illustrates a block diagram of a vehicle 700 according to a specific embodiment of the present invention. Vehicle 700 includes a radar sensor 100, especially according to one of the above specific embodiments, and also an ascertainment device 701 which is designed to ascertain a quantity with regard to a driving parameter and/or an operating state of the vehicle. For instance, ascertainment device 701 may detect a speed of vehicle 700, in particular a standstill of vehicle 700, or an emergency situation, which is able to be recognized by a driver assistance system, in particular. Furthermore, ascertainment device 701 can measure an operating temperature of radar sensor 100. The quantity determined by ascertainment device 701 is transmitted as control input signal to control device 101 of radar sensor 100.

Signal generator 102 of radar sensor 100 is designed to ascertain the number of blocks 301 selected for the output signal on the basis of the control input signal. For instance, the number of blocks that are selected for the output signal can be reduced as soon as the operating temperature of radar sensor 100 exceeds a predefined threshold value. Signal generator 102 may be developed to initially omit individual signal cycles 202, as illustrated in FIG. 5. In particular, the signal cycles may be omitted periodically, such as every second signal cycle, every third signal cycle or every tenth signal cycle, and a period of omitting signal cycles 202 may depend on the operating temperature of radar sensor 100. According to one further specific embodiment, signal generator 102 may be designed to output shortened signal cycles 402 as output signal, as illustrated in FIG. 4; each signal cycle 202 is able to be shortened or a certain number of signal cycles are able to be shortened, especially at periodic intervals, while the other signal cycles are fully selected for the output signal. Signal generator 102 may also be designed to combine the methods illustrated in FIG. 4 and FIG. 5, as shown in FIG. 6. For instance, signal generator 102 may first omit signal cycles as illustrated in FIG. 5, and given a further rise or, if the operating temperature of radar sensor 100 does not decrease, signal generator 102 may shorten the signal cycles in the signal cycles not omitted, as illustrated in FIG. 6.

However, signal generator 102 may also be developed to first shorten signal cycles 202, as illustrated in FIG. 4, and given a rise, or if the operating temperature of radar sensor 100 fails to decrease, signal generator 102 may omit individual signal cycles 202, in particular also periodically, as illustrated in FIG. 6.

If the operating temperature of radar sensor 100 drops below the specified threshold value, signal generator 102 may be designed to select all blocks of all signal cycles for the output signal.

Furthermore, signal generator 102 may be developed to select all blocks 301 of all signal cycles 202 if the ascertainment device has detected a danger state of the vehicle. Signal generator 102 may also be designed to omit, or not select, at least one block if an operating temperature lies above a specified threshold value for a specified period of time. Radar sensor 100 may be designed to switch off if the operating temperature of radar sensor 100 lies above a specified threshold value for a specified period of time and if the signal generator selects all blocks for the output signal.

Figure 8:
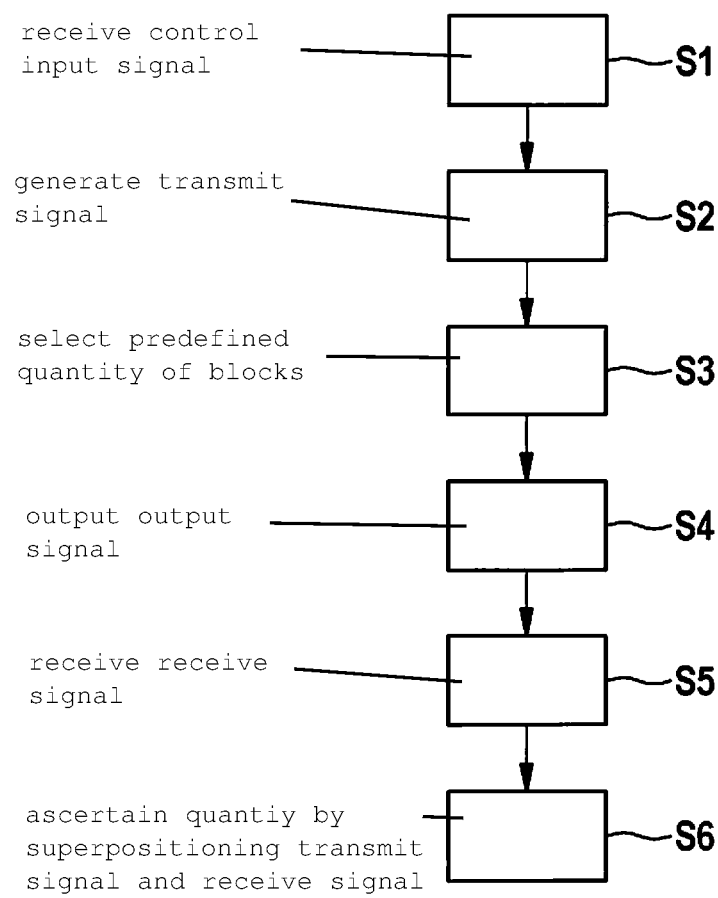
FIG. 8 shows a flow diagram of an exemplary operating method.

FIG. 8 illustrates a flow diagram to elucidate an operating method of a radar sensor 100 for detecting at least one object. In this instance, radar sensor 100 may correspond to one of the afore-described specific embodiments of radar sensor 100, in particular.

In a first step S1, a control input signal is received via a control device 101.

In a second step S2, a transmit signal 201 having a multitude of signal cycles 202 is generated.

As illustrated in FIG. 3, each signal cycle 202 has a multitude of signal sequences 302, each signal sequence 302 having an identical multitude of frequency ramps 303; frequency ramps 303 of signal sequences 302 are interlaced with one another in a predefined sequence without overlap. This produces a series of blocks 301, and each block 301 has exactly one frequency ramp 303 of each signal sequence 302.

In a third step S3, a predefined quantity of blocks 301 is selected from transmit signal 201. Here, the selection takes place on the basis of the control input signal. The predefined quantity of blocks 301 is output as output signal. In a fourth step S4, the output signal is output via an antenna device 103. In a fifth step S5, a receive signal, which corresponds to a reflection of the output signal at the at least one object, is received.

In a sixth step S6, a quantity with regard to an angle and/or a distance and/or a relative speed of the at least one object is ascertained by superpositioning the transmit signal and the receive signal.

What is claimed is:

1. A radar sensor for detecting at least one object, comprising:
   a control device designed to receive a control input signal;
   a signal generator designed to generate a transmit signal having a multitude of signal cycles, each of the signal cycles having a multitude of signal sequences, each of the signal sequences having a respective identical multitude of frequency ramps, the frequency ramps of the signal sequences being interlaced with one another in a predefined sequence without overlap, and a series of blocks being formed, each block having precisely one frequency ramp of each signal sequence, and the signal generator furthermore being designed to select a predefined quantity of blocks from the transmit signal based on the control input signal and to output them as output signal;
   an antenna device designed to transmit the output signal output from the signal generator and to receive a receive signal; and
   an evaluation device designed to ascertain, by superpositioning the transmit signal and the receive signal, a quantity with regard to at least one of: an angle, a distance, and a relative speed of the at least one object.

2. The radar sensor as recited in claim 1, wherein the signal generator is designed to select at a predefined control input signal in at least one signal cycle all blocks except for at least one of: i) a first number of blocks at a beginning of the signal cycle, and ii) a second number of blocks at an end of the signal cycle, wherein the signal generator outputs the selected blocks as the output signal.

3. The radar sensor as recited in claim 2, wherein the first number of blocks is equal to the second number of blocks.

4. The radar sensor as recited in claim 1, wherein the signal generator is designed to select none of the blocks for the output signal at a predefined control input signal in at least one signal cycle.

5. The radar sensor as recited claim 1, wherein the evaluation device is designed to ascertain the relative speed of the at least one object by:
   superpositioning the transmit signal and the receive signal;
   calculating frequency spectrums for each of the signal sequences for each of the signal cycles;
   ascertaining possible quantities with regard to the at least one of the angle, the distance, and the relative speed, of the at least one object based on position, amplitude and phase of signals in the frequency spectrums; and
   resolving ambiguities and ascertaining an unambiguous quantity with regard to the at least one of the angle, the distance, and the relative speed, of the at least one object, by comparing the possible quantities using position, amplitude and phase of the signals.

6. A vehicle, comprising:
   a radar sensor radar sensor for detecting at least one object, including a control device designed to receive a control input signal, a signal generator designed to generate a transmit signal having a multitude of signal cycles, each of the signal cycles having a multitude of signal sequences, each of the signal sequences having a respective identical multitude of frequency ramps, the frequency ramps of the signal sequences being interlaced with one another in a predefined sequence without overlap, and a series of blocks being formed, each block having precisely one frequency ramp of each signal sequence, and the signal generator furthermore being designed to select a predefined quantity of blocks from the transmit signal based on the control input signal and to output them as output signal, an antenna device designed to transmit the output signal output from the signal generator and to receive a receive signal, and an evaluation device designed to ascertain, by superpositioning the transmit signal and the receive signal, a quantity with regard to at least one of: an angle, a distance, and a relative speed of the at least one object; and
   an ascertainment device which is designed to ascertain a quantity with regard to at least one of a driving parameter and an operating state of the vehicle and to transmit it as control input signal to the control device of the radar sensor.

7. The vehicle as recited in claim 6, wherein:
   the ascertainment device is designed to measure an operating temperature of the radar sensor and to transmit it as control input signal to the control device of the radar sensor; and
   the signal generator of the radar sensor is designed to ascertain the number of blocks selected for the output signal on the basis of the operating temperature of the radar sensor.

8. An operating method of a radar sensor for detecting at least one object, comprising:
   receiving a control input signal;
   generating a transmit signal having a multitude of signal cycles, each of the signal cycles having a multitude of signal sequences, each of the signal sequences having a respective identical multitude of frequency ramps, the frequency ramps of the signal sequences being interlaced with one another in a predefined sequence without overlap, a series of blocks being formed and each block having precisely one of the frequency ramps of each of the signal sequences;

selecting a predefined quantity of blocks from the transmit signal based on the control input signal, and outputting the predefined quantity of blocks as output signal;

transmitting the output signal;

receiving a receive signal; and ascertaining a quantity with regard to at least one of an angle, a distance, and a relative speed, of the at least one object by superpositioning the transmit signal and the receive signal.

9. The operating method as recited in claim 8, wherein at a predefined control input signal, all blocks except for at least one of a first number of blocks at the beginning of the signal cycle and a second number of blocks at the end of the signal cycle are selected in at least one signal cycle and output as output signal.

10. The operating method as recited in claim 8, wherein at a predefined control input signal, none of the blocks is selected for the output signal in at least one signal cycle.

11. The operating method as recited in claim 8, wherein the ascertaining of the quantity with regard to the at least one of the angle, the distance, and the relative speed of the at least one object includes the following steps:

superpositioning the transmit signal and the receive signal;

calculating frequency spectrums for each of the signal sequences for each of the signal cycles;

ascertaining possible quantities with regard to the at least one of the angle, the distance, and the relative speed, of the at least one object based on position, amplitude and phase of signals in the frequency spectrums; and resolving ambiguities and ascertaining an unambiguous quantity with regard to the at least one of the angle, the distance, and the relative speed, of the at least one object by comparing the possible quantities using position, amplitude and phase of the signals.

* * * * *